(12) United States Patent
Shafique

(10) Patent No.: US 8,694,439 B2
(45) Date of Patent: Apr. 8, 2014

(54) METHOD AND SYSTEM FOR A GLOBAL GOAL BASED SOCIAL NETWORKING

(76) Inventor: Mohsin Shafique Shafique, Dallas, TX (US)

( * ) Notice: Subject to any disclaimer, the term of this patent is extended or adjusted under 35 U.S.C. 154(b) by 175 days.

(21) Appl. No.: 13/303,789

(22) Filed: Nov. 23, 2011

(65) Prior Publication Data
US 2013/0132866 A1 May 23, 2013

(51) Int. Cl.
G06Q 30/02 (2012.01)
G06Q 10/10 (2012.01)
G06Q 10/06 (2012.01)
G06Q 40/02 (2012.01)
G06Q 99/00 (2006.01)
G06Q 50/00 (2012.01)

(52) U.S. Cl.
CPC ...................................... *G06Q 50/01* (2013.01)
USPC .......................................... 705/319; 705/1.1

(58) Field of Classification Search
None
See application file for complete search history.

(56) References Cited

U.S. PATENT DOCUMENTS

| | | | |
|---|---|---|---|
| 7,756,806 B1* | 7/2010 | Heidenreich et al. | 706/46 |
| 8,032,470 B1* | 10/2011 | Heidenreich et al. | 706/45 |
| 2009/0099854 A1* | 4/2009 | Johanson | 705/1 |
| 2010/0037170 A1* | 2/2010 | Poole | 715/772 |
| 2010/0250424 A1* | 9/2010 | Torres | 705/37 |
| 2011/0288947 A1* | 11/2011 | Biran | 705/26.1 |
| 2012/0084372 A1* | 4/2012 | Cohen | 709/206 |
| 2012/0308970 A1* | 12/2012 | Gillespie et al. | 434/236 |

* cited by examiner

*Primary Examiner* — Jonathan Ouellette
(74) *Attorney, Agent, or Firm* — Maqsood Ahmad

(57) ABSTRACT

The present invention provides a method and system for a Global Internet Goal based Social Networking Platform—Linkagoal. The Linkagoal provides an organized online forum for setting goals and finding solution by mutually sharing knowledge, expertise and experience with the like-minded goal oriented other Linkagoal user. The user links one or more goals and the corresponding action items on the Linkagoal platform. The user completes specific actions required to complete his goals. The Linkagoal forum is configured to have features including, but not limited to, a Linkagoal Goal Meter, a Linkagoal Chat' Aura, that further includes a Chat' Aura Integrated, a Chat' Aura Station, and a Chat' Aura Mobile. These features facilitate the Linkagoal users to achieve their goals efficiently, and successfully. The utility of the present invention extends to numerous commercial and non-commercial applications.

22 Claims, 5 Drawing Sheets

METHOD AND SYSTEM FOR A GLOBAL GOAL BASED SOCIAL NETWORKING

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to networking. More particularly, the invention relates to a Global Goal based Social Networking Platform which provides an organized online Linkagoal forum for setting goals and finding solution by mutually sharing expertise and experience with other like-minded goal oriented Internet users. It is to be pointed out that the social networking platform as stated in the present invention further includes, without limitations, professional, educational and problem solving forums.

BACKGROUND OF THE INVENTION

Goals or objectives streamline and structure our lives and allow us to measure our progress. Typically, a goal is a projected state of affairs that a person or an entity plans to achieve as a personal or organizational end result. Often, people stop at the discovery of their goals, because either they lake resources or they do not solicit guidance to accomplish their planed goals. Many people would like to support others in planning and achieving their goals, but they don't find a mass communication platform to share their expertise and experience with others.

The concept of networking is to expand one's knowledge for personal or professional advantage by sharing information with each other and benefiting from the shared information on a collective mass platform. The technological advances have made it easier to contact each other, but still it requires a person-to-person contact. The e-mail systems are well known to the public. These systems transmit information among the users, where each user is identified by a unique e-mail address. The e-mail systems may serve as an effective tool for mass communication depending upon the availability of e-mail address directories to the users. However, the e-mail address directories, generally, are not available free of charge, or may be too expensive to purchase from independent sources/suppliers. Some sources may be offering e-mail systems free of charge, however, for using such free of charge systems, the users are bombarded with unsolicited advertisements based on the personal information requested, which may include, but not limited to, hobbies, traits, education level or occupation. This may pose a significant nuisance, particularly when the user is anxiously awaiting an e-mail message from another person. The e-mail systems may be useful for advertising and marketing, as they generate money based on subscription cost or by advertising to the users. Otherwise, these e-mail systems are quite limited in their usefulness for sharing goals with each other.

A Goal based Social Networking Platform provides a forum for sharing goals with like-minded individuals. The importance of setting goals cannot be over emphasized. Research indicates that a vast majority of people remain unsuccessful in achieving their goals mainly due to lack of resources, guidance or experience. Goal setting allows us to measure our progress against the pursuit of our set goals.

Some networking platforms have been devised for setting goals, monitoring progress and sharing results with other like-minded individuals. For example, United State Published Patent Application No. 2011/0046981, titled: Goals and Progress Tracking for Recovery Based Social Networking, teaches a systems and methods for social networking, where the users can select different goals that are tracked via the social networking platform. In addition, healthcare professionals and supporters can make goals for users that are similarly tracked. Individualized discharge plans can be created for users to track and support recovery on an individual basis. Location based services can be used to verify the completion of goals and the discharge plan.

Another prior art, U.S. Pat. No. 6,175,831, titled: Method and apparatus for constructing a networking database and system, teaches a networking database containing a plurality of records for different individuals, where individuals are connected to one another in the database by defined relationships. Each individual has the opportunity to define the relationship which may be confirmed or denied. E-mail messaging and interactive communication between individuals and a database service provider provides a method of constructing the database. The method includes having a registered individual identify further individuals and define therewith a relationship. The further individuals then, in turn, establish their own defined relationships with still other individuals. The defined relationships are mutually defined.

Another prior art, U.S. Pat. No. 7,966,369, titled: Method and apparatus for collecting and disseminating information over a computer network, teaches a device and method for collecting and disseminating information over at least one computer network is disclosed. The apparatus comprises at least one database for storing digital information associated with at least a first user and a second user, at least one links module for the first user to link to at least a portion of said digital information associated with said second user and for the second user to link to at least a portion of said digital information associated with said first user, at least one manipulations module for manipulating said digital information stored in said at least one database, and at least one display device associated with each of the at least first user and second user for respectively displaying at least said linked digital information to each of said at least first user and second user, wherein said linked digital information associated with said first user is automatically updated on at least said display device of said second user when that information is manipulated, and wherein said linked digital information associated with said second user is automatically updated on at least said display device of said first user when that information is manipulated.

However, there are no findings in the prior art that teach, or suggest a networking method and system for linking a goal so uniquely, effectively and efficiently as depicted in the present invention. Additionally, there are no findings in the prior art that teach, or suggest a method and system as depicted in the present invention. The present invention uniquely supports, or provides guidance to other users in planning, achieving and sharing their plans, goals, expertise and experience with other like-minded users utilizing an Internet operational global goal based social network platform.

Accordingly, in view of the foregoing, there is a need for a global goal based social network platform where Internet users are able to register, link and share their goals with like-minded other users with similar knowledge, expertise, skills, experience and interests. This invention fulfills the need for a Global Goal based Social Networking Platform, Linkagoal, for setting goals, finding solution by sharing expertise and experience with other like-minded Internet users. The present invention fulfills the aforementioned need effectively and efficiently, and the utility of the present invention extends to numerous commercial and non-commercial applications.

SUMMARY OF THE INVENTION

To achieve the forgoing and other objectives and in accordance with the purpose of the present invention, a process and system for a Goal based Social Networking Platform, Linkagoal, for setting goals, finding solution by sharing expertise and experience with other like-minded individuals is presented. It is to be understood that the present invention is not limited to the particular methodology, system, techniques, uses, and applications, described herein, as these may vary. It is also to be understood that the terminology used herein is used for the purpose of describing particular embodiments only, and is not intended to limit the scope of the present invention.

In one embodiment of the present invention, a method for an exemplary sequence of the mode of action for writing at least one goal on the Linkagoal platform, where users connect to one another based on alike/common goals/interests and facilitate one other in achieving their goals. Linking at least one goal on the Linkagoal platform includes the steps of writing at least one goal by a user on the Linkagoal platform. The user adding milestones to the at least one goal. The user defining specific tasks/actions required to accomplish the goals, and responsive to his actions, the user substantially, monitoring the outcome of his actions. The users are able to share the goals with the other Linkagoal users, and benefit from one another's knowledge, expertise, experience, feedback, and mutual support.

In another embodiment of the present invention, a method for an exemplary sequence of the mode of action for a global goal based social networking platform comprises the step of adding the identified obstacles that may stand in one's way in achieving their intended goals. This is accomplished by using the noval feature of the present invention, Goal Matter-Gray. The Goal Matter-Gray allows a user to incorporate his plans to take appropriate actions against the identified obstacles and thus, substantially increasing the probability of achieving his intended goals.

In another embodiment of the present invention, a method for an exemplary sequence of the mode of action for a goal based social networking platform comprises the steps of adding a list of benefits of successfully achieved the intended goals by using the Goal matter-White feature of the present invention.

In another embodiment of the present invention, a method for an exemplary sequence of the mode of action for a global goal based social networking platform comprises the steps of dividing complicated goal plans into manageable segments by using the Branches feature of the present invention. This allows a user to identify his sub-goals within the main goal. This facilitates the user to be substantially specific that what is to be required to accomplish his main goal.

In another embodiment of the present invention, a method for an exemplary sequence of the mode of action for a global goal based social networking platform comprises the steps of providing the users with a Joint Linkagoal platform. The joint platform enables the users to benefit mutually by sharing ideas, techniques and experience with one another.

In another embodiment of the present invention, a method for an exemplary sequence of the mode of action for a global goal based social networking platform comprises the steps of enlisting a user as a mentor, a facilitator, or a role model. The linkagoal forum allows a user to find another user with whom he is able to share his common goals.

In another embodiment of the present invention, a method for an exemplary sequence of the mode of action for a global goal based social networking platform comprises the steps of metering the in-progress intended goals. This unique feature of the present invention incorporates a "Goal Meter," a goal tracking system that allows the user to be prepared and organized for achieving his intended goals.

Note: It is to be pointed out that goal meter is a progress bar and is scaled on timelines that a user establishes subsequent to creating his goal on the Linkagoal forum. All goals, the respective milestones and actions/tasks have their start date and end date. Responsive to the user's updating the task activity, the status of the goal progress is updated on the goal meter bar automatically.

In another embodiment of the present invention, a method for an exemplary sequence of the mode of action for a global goal based social networking platform comprises the steps of incorporating substantially, effective privacy settings by providing an option to the user to selectively share his goals/other information with the other users.

In another embodiment of the present invention, a method for an exemplary sequence of the mode of action for a global goal based social networking platform comprises the steps of incorporating a demand creation for generic products for providing an opportunity to business establishments/corporations to capture the generic product market through brand penetration. The business establishments/corporations, subsequent to registering the goals, are connected to appropriate contributors and order products/services from them to accomplish their business goals.

In another embodiment of the present invention, a method for an exemplary sequence of the mode of action for a global goal based social networking platform comprises the steps of managing task assignments using the Task Management System-TMS.

In another embodiment of the present invention, a method for an exemplary sequence of the mode of action for a global goal based social networking platform comprises the steps of linking a user to other Linkagoal users through an advanced messaging platform. The advanced messaging platform is configured to process messages on a single forum namely, My Linkagoal Messages. The advanced messaging platform includes, but not limited to, Text, Picture, and Video Messages provisions.

In another embodiment of the present invention, a method for an exemplary sequence of the mode of action for a global goal based social networking platform comprises the steps of linking a user to the other Linkagoal users through a chatting platform namely, Linkagoal Chat' Aura. The Linkagoal Chat' Aura platform is uniquely configured to enable the registered users to chat with one another other. The Linkagoal Chat' Aura platform includes, but not limited to, Chat' Aura Integrated, Chat' Aura Station, and Chat' Aura Mobile provisions.

Chat' Aura Integrated: This feature is configured to the Linkagoal platform/website. To enables a user or participant to establish a chat session with at least one other participant simultaneously, and provides the capability for the user to control the participation mode of all the participants. The user controls to allow the participants to use the read or write, or only read, or only write option.

Chat' Aura Station: Subsequent to creating a Linkagoal group, by default a chatting station is activated and remains live till the group owner decides to disconnect it. Using this feature, the group members have access to communicate with other members of the group by group chat.

Chat' Aura Mobile: This feature is designed and configured, without limitations, for the Tablet PCs and smart phone devices. The Chat' Aura mobile is an independent chatting application available for free downloading in popular Mobile Application Stores such as, but not limited to, Apple AppStore, BlackBerry Online Apps, Nokia Apps, and Android Apps. Subsequent to downloading the Chat' Aura mobile on a Tablet PC or a mobile device, the users are able to use their Linkagoal account to login, or register only for the Chat' Aura application. The users connected to the Chat' Aura stations on the Linkagoal Groups are able to communicate with one another, and control the Participation Mode.

In another embodiment of the present invention, a method for an exemplary sequence of the mode of action for a global goal based social networking platform comprises the steps of enabling a user to create, post, comment, and read from their own interests forums, and niche-specific forums by using the Linkagoal Group forum.

In another embodiment of the present invention, to achieve the foregoing and other objectives and in accordance with the purpose of the present invention, a system for a goal based social networking platform is presented. The system includes, without limitations, the Linkagoal platform configured to allow a user to link by writing at least one goal on the Linkagoal platform, the Goal Matter-Gray provision configured to allow the user to take at least one appropriate action against at least one obstacle which is likely to pose problems in accomplishing his goals, the Goal Matter-White provision configured to allow the user to continuously compare the Goal Matter-White with the Goal Matter-Grey to continue the pursuit of his goals until they are completed/accomplished successfully, the Branches provision configured to allow user to identify at least one sub-goals within the main goal, the contribution provision configured to allow the user to find a role model to benefit from the experience of the role model, the Goal Meter provision configured to enable the user to stay organized to accomplish his goals, the Manage My Task provision to enable the user to write, assign and mutually share at least one action items with other Linkagoal registered users, an alert mechanism configured to enable the user to automatically send an alert regarding the current status of the goals to the user, the Linkagoal Messages provision to enable the user to send messages to other participants, the Chat' Aura Integrated configured to enable the user to establish a chat session with other participants, the Chat' Aura Station configured to enable the user to be activate by default upon establishing a Linkagoal group by the user, and the Chat' Aura mobile configured to enable the user to be connected to the Chat' Aura station on the Linkagoal Group to communicate with at least one other participant. It is to be pointed out that the social networking platform as stated in the present invention further includes, without limitations, professional, educational and problem solving forums.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE EMBODIMENTS

Figure 1:
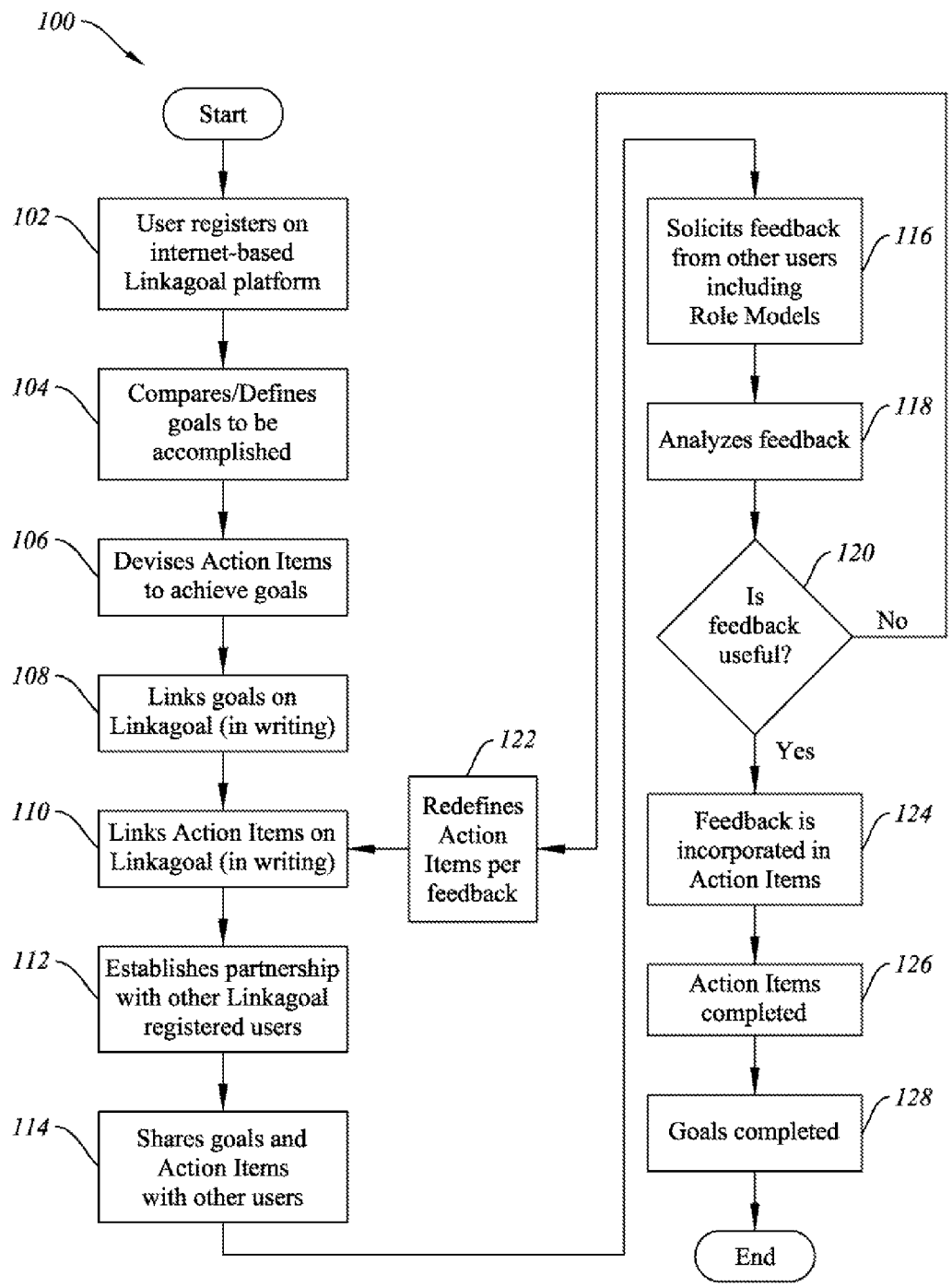
FIG. 1 is an illustration of exemplary flow chart depicting the process for the global goal based social network platform-Linkagoal, in accordance with an embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it must be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

It is to be, specifically, emphasized that any teaching or combination of teachings, any novel feature, or any novel combination of features including the novel processing mechanism, or any combination of novel processing mechanisms for the wet filtration of airborne contaminants, in accordance with an embodiment of the present invention, is clearly distinguished form the prior art, because no prior art either alone or in combination teaches all of the features of the present invention. It is emphasized that the current invention significantly differentiates itself from prior arts, and in particularly from US Published Application No 2011/0035291, which teaches a method and system for online distribution of information.

To achieve the forgoing and other objectives and in accordance with the purpose of the present invention, a process and system for Internet supported Goal based Social Networking Platform, Linkagoal, for setting goals, finding solution through sharing expertise and experience with other likeminded individuals is presented. It is to be understood that the present invention is not limited to the particular methodology, system, techniques, uses, and applications, described herein, as these may vary. It is to be understood that the terminology used herein is used for the purpose of describing particular embodiments only, and is not intended to limit the scope of the present invention.

The present invention is illustrated by way of example, and not by way of limitation, in the figures of the accompanying drawings and in which like reference numerals refer to similar elements and in which:

FIG. 1 is an illustration of exemplary flow chart 100. The flow chart 100 illustrates an integrated process for the global goal based social networking platform-Linkagoal, in accordance with an embodiment of the present invention. The flow chart 100 depicts that the user initiates and completes registration the global goal based social networking platform-Linkagoal 102. The user defines one or more goals 104 to be accomplished. The goals 104 includes, without limitations, interests, and objective. The user devises and defines one or more action items 106 to be completed in order to achieve/accomplish the defined goals 104. The action items 106 include, without limitations, one or more milestone, and tasks. The user links 108 one or more goals 104 on the goal based social networking platform—Linkagoal 102, in which requires the linking of goals requires the user to write his goals 104 on the platform-Linkagoal 102. The user Links 110 one or more action items 106 on the goal based social networking platform-Linkagoal 102, which requires the user to write his action items 106 on the platform-Linkagoal 102.

It is to be pointed out that planning and setting one's goals 104 in writing is quite important and valuable. For example, a study on Goal Setting in writing conducted by the Harvard University, Titled: Why 3% of Harvard MBAs makes ten times of the other 97% of the world combined? Conclusion: the answer was a simple question: "Have you set clear, written goals for your future and made plans to accomplish them?" (Source: from the book "What They Don't Teach you in the Harvard Business School, by Mark McCormack).

In 1979, interviewers asked new graduates from the Harvard MBA Program with the following findings:
About 84% had no specific goals at all;
About 13% had goals but they were not committed to paper; and
About 3% had clear, written goals and plans to accomplish them preface.
In 1989, the interviewers again interviewed the graduates of that class, with the following results:
About 13% of the class who had goals was earning, on average, twice as much as about 84 percent who had no goals at all; and
Even more staggering—about 3% who had clear written goals were earning, on average, ten times more than the other about 97%.

Referring again to FIG. 1, the linked action items 110 are devised in relevance to the linked goals 108 to complete the linked goals 108. The user initiates and establishes partnership 112 with other registered Linkagoal users. The partnership 112 enables the user to share his linked goal 108 and action items 110 with the other Linkagoal users by using a sharing process 114. The sharing process 114 enables the user to solicit suggestions, guidance, support, or feedback 116 from the other registered Linkagoal users. The feedback 116 may include input from the role models. It is to be pointed out that role models are the registered Linkagoal users, but may not have essentially, any specific goals linked on the platform-Linkagoal 102. In response to receiving the solicited feedback 116, the user analyzes 118 the feedback 116, and makes a determination 120 as to how to benefit/use the analyzed feedback 118 to streamline, resolve, or complete the action items 106. If the analyzed feedback 118 upon determination 120 is considered not relevant, the action items 110 are re-defined 122 and relevant process steps are repeated. If the analyzed feedback 118 upon determination 120 is considered relevant and useful, then it is incorporated 124 to the process for further processing. The user completes the action items 126, and subsequent to completing the action items 126, the user finally, completes or concludes 128 the linked goals 108.

In one embodiment of the present invention, not shown in the drawings, the Linkagoal comprises a Goal Meter provision. The goal meter is a goal tracking system which facilitates a user to informed and organized for achieving the intended goals. Generally, the information is presumed to be scattered around rendering the task out of control and undermines the user's motivation. The goal meter substantially, monitors all action taken by the user and reflected as the goal progress on the goal meter readout bar. Additionally, it is to be pointed out that goal meter is a progress bar, and it is scaled on timelines that the user establishes subsequent to creating his goals on the Linkagoal forum. All goals, the respective action items, milestones and tasks have start and end date. Responsive to the user's updating the task, the status of the goal progress is updated on the goal meter bar automatically.

Figure 2:
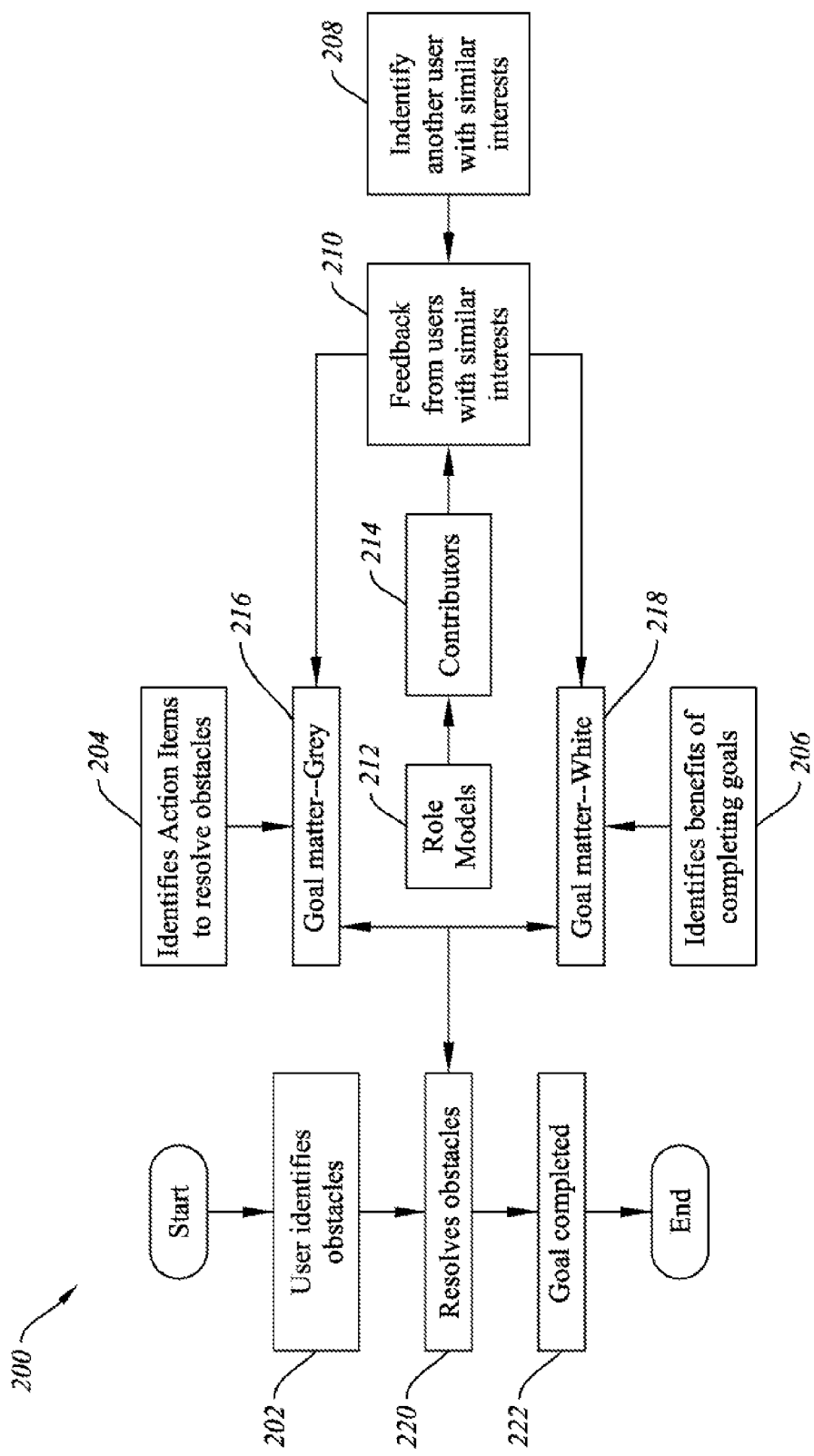
FIG. 2 is an illustration of exemplary flow chart depicting the process for resolving an obstacle for the global goal based social network platform-Linkagoal, in accordance with an embodiment of the present invention.

FIG. 2 is an illustration of exemplary flow chart 200 depicting the process for resolving one or more obstacles for the global goal based social networking platform-Linkagoal 100, as depicted in FIG. 1, in accordance with an embodiment of the present invention. To resolve one or more obstacles, the user identifies the obstacles 202 to be resolved. Subsequently, the user identifies action items 204 necessary to resolve the identified obstacles 204, and the benefits of completing one or more goals 406. Another registered user with similar interests is identified 208. Feedback 210 is requested form the identified registered user with similar interests 208. Feedback 210 is also requested form the role models 212, and contributors 214. The consolidated feedback 210 input is then added to the Goal matter-Grey 216, and to the Goal matter-White 218. The Goal matter-Grey 216 allows the Linkagoal user to incorporate his plans to take appropriate actions 204 to resolve the identified obstacles 202 and thus, substantially increases the probability for achieve the intended goals. The Goal Matter-White 218 identifies benefits of completing goals. For example, walking a mile every morning will benefit the user stay healthy, active, and focused at work. The user is able to choose to continuously compare the Goal Matter-Grey 216 (Obstacles) and Goal Matter-White 218 (Benefits) to continue to, pursue his goals, until the goals are successfully accomplished. Any combination of information or data from the Goal matter-Grey 216 and the Goal matter-White 218 is used to resolve the identified obstacles 204. Subsequent to resolving 220 the obstacles 202, the goal completion task 222 is completed.

Referring again to FIG. 2, it is to be pointed out that Linkagoal forum allows a user to find another user with whom he is able to share his goals. For example, finding another user to go to gym, quit smoking, or share healthy meals and thus, sharing and benefiting from one another's experience significantly enhances the probability of success in accomplishing their intended goal. The Linkagoal users may also act as partners and help one another to stay committed and motivated in achieving their intended goals. Additionally, the users are able to search for role models 212 who have already achieved their goals successfully. The role models 212 are instrumental in making valuable contributions by sharing their contributions in terms of knowledge, expertise and experience with the other users. Note: the contributors 214 are essentially, the Linkagoal forum users who have not set goals for themselves, but based on their knowledge, skills, expertise, and experience are willing to help other users in achieving their goals relatively, efficiently and expediently.

In one embodiment of the present invention, not shown in the drawings, the Linkagoal forum is configured to comprise a joint platform. The joint platform enables the users to benefit mutually by sharing ideas, techniques and experience with one another. Additionally, on the joint platform, the users are able to monitor their progress, and challenge one another's plans, actions, or goals by suggesting the tasks which are helpful in achieving the users mutual goals relatively, efficiently and expediently.

In one embodiment of the present invention, not shown in the drawings, privacy settings are configured that provide an option to the user to selectively share his goals and other information with the other users. For example, a user is able to share a goal with friend A, and shares another goal with friend B separately. The Linkagoal platform is essentially equipped with a provision enabling the user to categorize the user's contacts and selectively configuring wall information for each user friend separately.

Figure 3:
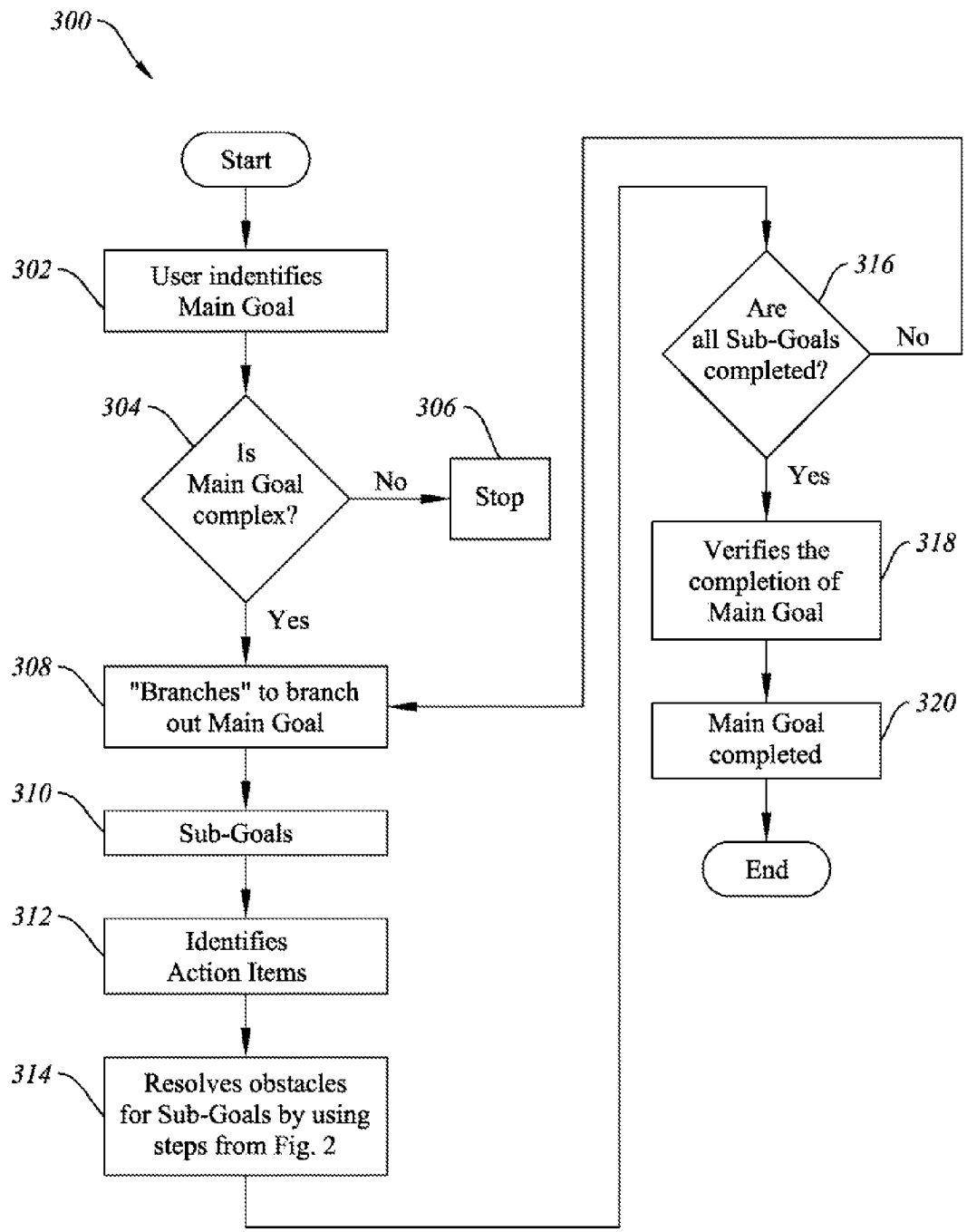
FIG. 3 is an illustration of exemplary flow chart depicting the process for dividing the main goal into sub-goals for improving the process efficiency for the global goal based social network platform-Linkagoal, in accordance with an embodiment of the present invention.

FIG. 3 is an illustration of exemplary flow chart 300 depicts the process for dividing complicated goal plans into manageable segments for the global goal based social networking platform-Linkagoal 100, as depicted in FIG. 1, in accordance with an embodiment of the present invention. Transforming complicated goals into manageable segments allows the user to identify his sub-goals within the main goal facilitates the user to be relatively, more specific to accomplish his main goal. Additionally, long term goals are further divided to manageable sub-goals. It is to be pointed out that dividing one or more main goals into manageable sub-goals is well suited particularly, for complex goals. To divide complicated/complex goal plans into manageable segments, the user identifies 302 one or more main goals, and determines the complexity 304 of one or more goals. If the goal is not deemed complex by the user and does not substantially, requires dividing the main goals into manageable sub-goals, the dividing process is terminated 306 to follow the general process as depicted in FIG. 1. However, if one or more goals are deemed complex by the user, then the complex goals, by using the Linkagoal provision Branches 308, are divided into manageable sub-goals 310. Subsequent to dividing the complex goals to manageable sub-goals 310, the user identifies the action items 312 to resolve the identified sub-goals 310. The obstacles 314 pertinent to sub-goals are resolved by using relevant processing steps from FIG. 2. A determination 316 as to the completion of sub-goals is made by the user. If all sub-goals are not resolved, then Branches 308 are used again to divided complex goals into manageable sub-goals 310 until all the sub-goals are resolved. If all sub-goals are resolved successfully, completion of the complex main goal is verified 318 and finally, the completion 320 of the complex main goal is concluded.

Figure 4:
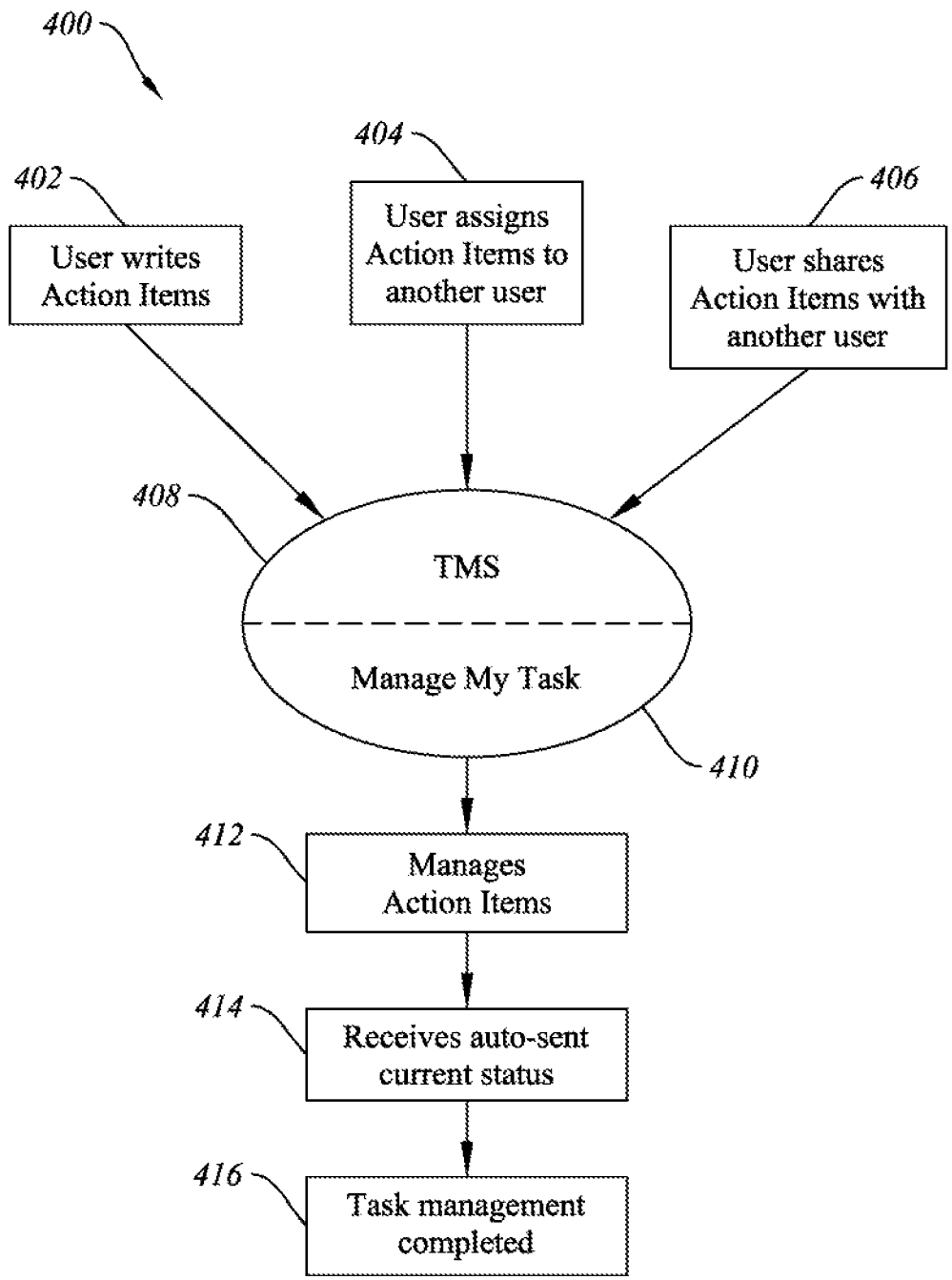
FIG. 4 is an illustration of exemplary flow chart depicting the process for managing a task using the global goal based social network platform-Linkagoal, in accordance with an embodiment of the present invention.

FIG. 4 is an exemplary flow chart 400 illustrating the process for managing a task using the global goal based social networking platform-Linkagoal, as depicted in FIG. 1, in accordance with an embodiment of the present invention. The Task Management System TMS 408 includes the Manage My Task 410 provision. The TMS 408 is configured to include the user writing the action items 402, assigning 404 the action items 402 to an another registered user, and sharing 406 the action items 402 with another registered user. The TMS 408 is further configured to process the input information, and manages the action items 412 in sequential and logical order which plays a vital role in the effective resolution of primary/main goals. The user receives the auto-sent current status 414, and the user logically concludes/completes 416 the desired task management.

In one embodiment of the present invention, not shown in the drawings, the TMS 408 performs more than one function, without limitations, for example, connecting a linked user to a goal, the goal owner writing and assigning the tasks, distributing action items to other users, and each user accepting his responsibility for achieving his goals efficiently and expediently. There are at least five types of tasks displayed on the Linkagoal forum, and these tasks are represented by a color coding scheme. The tasks assigned by the user, or assigned to the user by another user are depicted as the consolidated information in a tabular form for the user's visibility and review. Additionally, a comprehensive alert mechanism is configured to automatically send alerts on expiry of a task, or status update to the user.

In one embodiment of the present invention, not shown in the drawings, the Linkagoal networking platform is essentially, configured to link a user to the other Linkagoal users using an advanced messaging platform. The advanced messaging platform is configured to process messages on a single forum namely, My Linkagoal Messages. The advanced messaging platform includes, but not limited to, Text, Picture, and Video Messages provisions.

Using the Text and Picture Messages provision, a user is able to exchange messages with other users in a known group/community, or to any other Linkagoal registered user. The recipient user is able to configure privacy setting enabling the recipient user to control from whom he wants to receive emails, or text and picture messages. These text and picture messages are sent using the Linkagoal email address to Linkagoal email Address, or to any other email service.

The Video Messages provision is configured to the Linkagoal mobile application. Using the Video Messages provision enables a user to upload messages directly the user's mobile devices. The Video Messages provision allows the user to upload video clips immediately upon the completion of a task, or a milestone, or a goal. This functionality allows the user to record and send a specific action related to a task used as a proof of the specific task completion. It saves writing on compact mobile devices. The user receives video messages on My Linkagoal Messages, and the messages also get tagged to a specific goal, a milestone, or a task.

Figure 5:
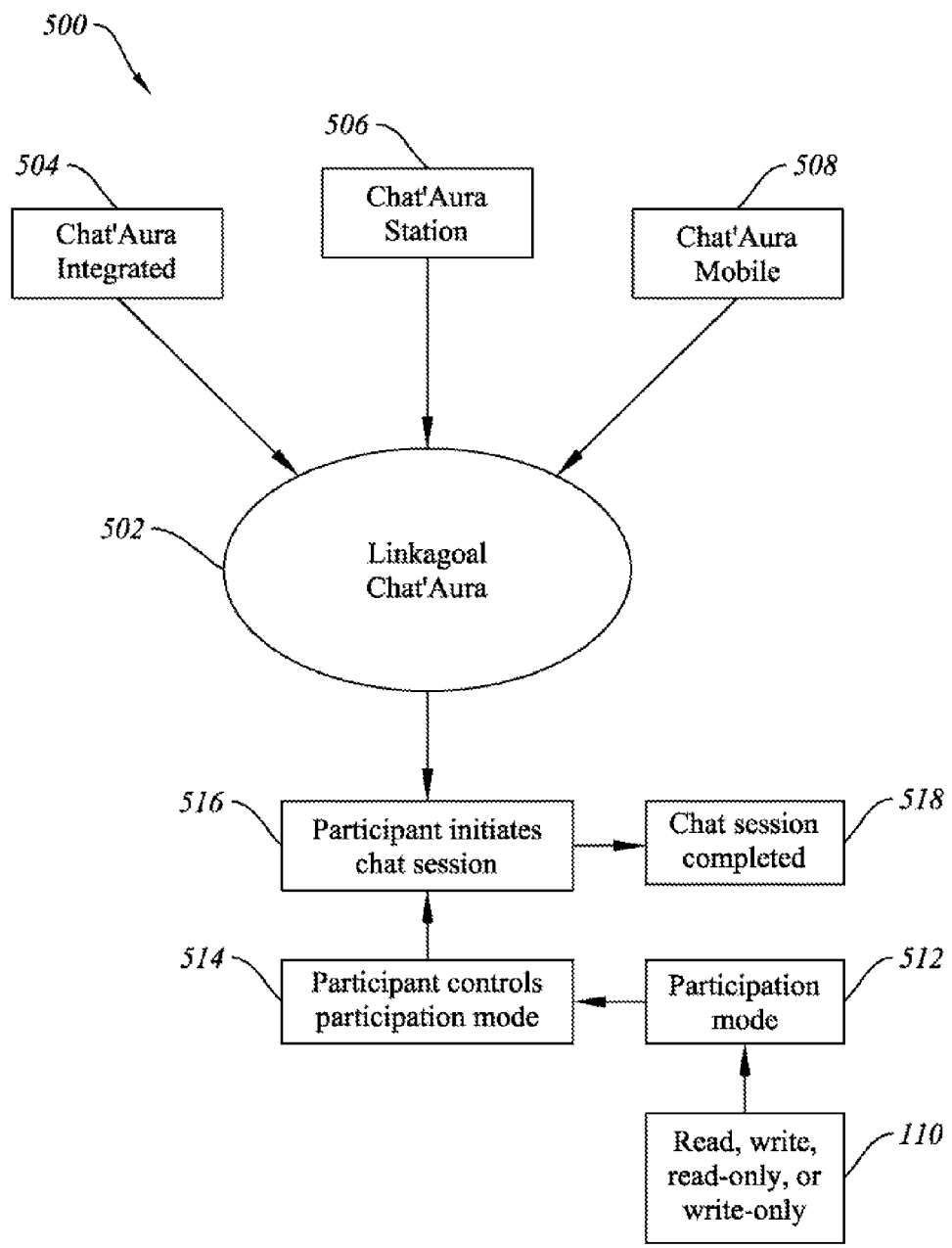
FIG. 5 is an illustration of exemplary flow chart depicting the process for the chatting platform for the global goal based social network platform-Linkagoal, in accordance with an embodiment of the present invention.

FIG. 5 is an exemplary flow chart 500 illustrating the process for the Linkagoal Chat' Aura 500, using the global goal based social networking platform-Linkagoal, as depicted in FIG. 1, in accordance with an embodiment of the present invention. The Linkagoal Chat' Aura 502 is uniquely configured to enable the Linkagoal registered users to chat with one another other. The Linkagoal Chat' Aura 502 includes, but not limited to, Chat' Aura Integrated 504, Chat' Aura Station 506, and Chat' Aura Mobile 508 provisions.

Referring again to FIG. 5, the Chat' Aura Integrated 504, without limitations, is configured to enable the Linkagoal registered user and one or more participants to establish a chat session simultaneously. The user controls to allow the participants to read or write, or only read, or only write 510 options. The Chat' Aura Integrated 504 also allows the user to control the participation mode 512 of the participants. The participation mode 512 includes, read or write, or only read, or only write 510 options. The participants are able to control the participation mode 514 which also includes, read or write, or only read, or only write 510 options. All participants, including the user initiate a chat session 516, and complete the chat session 518.

It is to be pointed out that the user also controls the visibility of a participant(s) in the chat closet that which participants are to be allowed to see chat session 516 for a specific participant. Additionally, during a group chat session, a user is able to pick another person (unregistered) for a private chat and establish a private chat session with that person.

Regarding the Chat' Aura Station 506, subsequent to creating a Linkagoal group, by default a chatting station is activated and remains live till the group owner decides to disconnect it. The group members have access to communicate with other members of the group through group chat. The group users, if desired, have the discretion to establish a chat closet and invite only selected members from the group. The chat closets receive Chat' Aura knocks from other members from the group who are interested to participate in this chat session. Each Chat' Aura session represents a number of Chat' Aura knocks including the participants. The number of knocks establishes a baseline for this chat closet's popularity that attracts/invites essentially, additional users to participate in this chat session. It is to be pointed out that, without limitations, The Chat' Aura station 506 is an advance chatting platform and is configured/integrated within each Linkagoal group. This function allows the group users in getting touch immediately with other users in addition to writing and posting their blogs. The key features of the Linkagoal group include, but not limited to, the Chat' Aura station, image and video galleries, and Linkagoal group calendars.

Regarding the Chat' Aura Mobile 508, this feature is designed/configured, without limitations, for the Tablet PCs and smart phone devices. The Chat' Aura mobile 508 is an independent chatting application available for free downloads in popular mobile application Stores such as, but not limited to, Apple AppStore, BlackBerry Online Apps, Nokia Apps, and Android Apps. Subsequent to downloading the Chat' Aura mobile 508 on a Tablet PC or a mobile device, the users are able to use their Linkagoal account to login, or register only for the Chat' Aura application 502. The users connected to the Chat' Aura station 504 on the Linkagoal Groups are able to communicate with one another, and control the Participation Mode 516 as part of Chat' Aura Integrated 504.

In one embodiment of the present invention, not shown in the drawings, a method for an exemplary sequence of the mode of action for a global goal based social networking platform comprises the steps of enabling a user to create, post, comment, and read from their own interests/niche-specific forums by using the Linkagoal Group forum. The Linkagoal Group forum is an extended social networking service. For example, this feature allows the user A to select to publish his goals including groups of his own interest and draw attention from the masses. The Linkagoal Group is configured to provide mini-networks within the relatively, large and diversified social networking service. It is owned and maintained by the group owner who controls the editing, posts to discussion threads, and regulates the behavior of members within the group. However, unlike traditional groups or forums, the Linkagoal group in a social networking service that publishes goals to a relatively, larger umber people of essentially, similar interests.

In one embodiment of the present invention, to achieve the foregoing and other objectives and in accordance with the purpose of the present invention, a system for a global goal based social networking platform is presented. The system includes, without limitations, a Linkagoal platform configured to allow a user to link by writing at least one goal on the Linkagoal platform, the Goal Matter-Gray provision configured to allow the user to take appropriate actions against at least one obstacle likely to pose problems in accomplishing/completing the goal, the Goal Matter-White provision configured to allow the user to continuously compare the Goal Matter-White with the Goal Matter-Grey to continue the pursuit of the goal until it is accomplished successfully, the Branches provision configured to allow the user to identify at least one sub-goals within the main goal, the contribution provision configured to allow the user to find a role model to benefit from the experience of the role model, the Goal Meter provision configured to enable the user to stay organized to accomplish his goal, the Manage My Task provision configured to enable the user to write, assign and mutually share one or more action items with other Linkagoal registered users, an alert mechanism configured to enable the user to automatically send an alert regarding current status of the goal to the user, the Linkagoal Messages provision to enable the user to send messages to other participants, the Chat' Aura Integrated configured to enable the user to establish a chat session with other participants, the Chat' Aura Station configured to enable the user to be activate by default upon establishing a Linkagoal group by the user, and the Chat' Aura mobile configured to enable the user to be connected to the Chat' Aura station on the Linkagoal Group to communicate with one or more participants.

Having fully described at least one embodiment of the present invention, other equivalent or alternative methods of providing an integrated fluid treatment system according to the present invention will be apparent to those skilled in the art. The invention has been described above by way of illustration, and the specific embodiments disclosed are not intended to limit the invention to the particular forms disclosed. For example, the particular implementation of the method and system may vary depending upon the particular type of application for which it is to be used. The method and system described in the foregoing were directed to method and system for a global goal based social networking platform; however, similar alternatives may be used for other, for example, but not limited to, a global goal based social networking platform, refining/improvement processes, implementations of the present invention are contemplated as within the scope of the present invention. The invention is thus, to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

I claim:

1. A method for global goal based social networking comprising the steps of:
    logging into Linkagoal platform by a user using a computer wherein said Linkagoal platform further comprises professional, educational and problem solving forums;
    registering on said Linkagoal platform by said user;
    linking at least one goal by said user on said Linkagoal platform;
    linking at least one action item for accomplishing said at least one goal by said user on said Linkagoal platform;
    dividing complicated goal plans into manageable segments by using Branches provision by said computer, wherein said Branches provision allows said user to identify at least one sub-goal within a main goal, and wherein identifying said at least one sub-goal within said main goal enables said user to be substantially specific as to what is to be required to accomplish said main goal;
    sharing said at least one goal by said user with at least one other Linkagoal registered user having essentially similar interests for feedback;
    analyzing said feedback from said at least one other Linkagoal registered user having essentially said similar interests by said user by said computer;
    optimizing completion process for said at least one goal by using Goal Matter-White provision and Goal Matter-Grey provision comparison results by said computer; and completing said at least one action item for accomplishing said at least one goal by said user by using said feedback from said at least one other Linkagoal registered user.

2. The method of claim 1, wherein said user and is said at least one other Linkagoal registered user are two different Linkagoal registered Internet users.

3. The method of claim 2, wherein said Linkagoal platform is an Internet supported global goal based social networking platform, and wherein said Linkagoal platform further comprises professional, educational and problem solving forums.

4. The method of claim 3, wherein said similar interests include essentially similar knowledge, expertise, skills, and experience.

5. The method of claim 4, wherein accomplishing said at least one goal further comprises adding at least one obstacle likely to pose at least one problem in accomplishing said at least one goal by using said Goal Matter-Gray provision, and wherein said Goal Matter-Gray provision enables said user to take appropriate said at least one action item against said at least one obstacle.

6. The method of claim 5, wherein accomplishing said at least one goal further comprises the steps of enabling said user to obtain information from said at least one other Linkagoal registered user, wherein said information is used to accomplish said at least one goal, and wherein said information includes knowledge, expertise, skills, experience, in-progress goals status, and completed goals status.

7. The method of claim 6, wherein accomplishing said at least one goal further comprises steps of enabling said user to find said at least one other Linkagoal registered user having essentially similar goals by using Linked Goals provision, wherein said Linked Goals provision allows said user to establish partnership with said at least one other Linkagoal registered user to keep said user motivated in accomplishing said at least one goal.

8. The method of claim 7, wherein accomplishing said at least one goal further comprises steps of enabling said user to find a role model by using Contribution provision, wherein said role model has already accomplished said at least one goal successfully.

9. The method of claim 8, wherein said user is enabled to monitor on-going progress for said at least one goal by using Goal Meter provision, and wherein said Goal Meter provision further enables said user to stay organized to accomplish said at least one goal.

10. The method of claim 9, wherein said user is able to assign said at least one action item to said at least one other Linkagoal registered user having essentially said similar interests by using Task Management System TMS provision, and wherein said TMS provision includes Manage My Task provision, and wherein said Manage My Task provision enables said user writing, assigning, and mutually sharing said at least one action item with said at least one other Linkagoal registered user.

11. The method of claim 10, wherein said TMS provision further includes an alert mechanism, and wherein said alert mechanism automatically sends at least one alert regarding current status of said at least one goal to said user.

12. The method of claim 11, wherein My Linkagoal Messages provision allows said user to send and receive messages to at least one participant, wherein said at least one participant includes said at least one Linkagoal registered user, and at least one non-registered user, wherein said My Linkagoal Messages include text, picture, and video messages, and wherein said My Linkagoal Messages are tag-able including said at least one goal, and said at least one action item.

13. The method of claim 12, wherein said user is able to control to configure privacy settings for incoming and outgoing messages.

14. The method of claim 13, wherein said user is able to chat with said at least one participant using a chat platform Linkagoal Chat' Aura, and wherein said Linkagoal Chat' Aura includes a Chat' Aura Integrated, a Chat' Aura Station, and a Chat' Aura Mobile.

15. The method of claim 14, wherein said Chat' Aura Integrated enables said user to establish a chat session with said at least one participant, wherein said user is able to control participation mode with said at least one participant, and wherein said participation mode includes read, write, read only, or write only messages.

16. The method of claim 15, wherein said Chat' Aura Station is activated by default upon establishing a Linkagoal group by said user, wherein at least one member from said Linkagoal group is designated as owner of said Linkagoal group, wherein a Chat' Aura session stays active until it is disconnected by said owner, wherein said user is able to control participation mode, wherein said participation mode includes read, write, read only, or write only messages, and wherein said Chat' Aura session is configured to record and display number of knocks.

17. The method of claim 16, wherein said Chat' Aura Mobile is an independent chatting application available for downloads from mobile application stores on a Tablet PC or a mobile device, wherein upon said downloads said Chat' Aura mobile on said Tablet PC or said mobile device enables said user to be connected to said Chat' Aura station on Linkagoal Group to communicate with said at least one participant, wherein said user is able to control said participation mode with said at least one participant, and wherein said participation mode includes read, write, read only, or write only messages.

18. A computer implemented system comprising:
   a Linkagoal platform configured to allow a user to link by writing at least one goal or action item by said user on said Linkagoal platform;
   a Goal Matter-Gray provision configured to allow said user to take appropriate corrective actions against at least one obstacle likely to pose problem in accomplishing at least one goal;
   a Goal Matter-White provision configured to allow said user to continuously compare said Goal Matter-White to said Goal Matter-Grey provision to continue pursuit of said at least one goal until said at least one goal is accomplished successfully by said user;
   a Branches provision configured to allow said user to identify at least one sub-goal within a main goal;
   a Contribution provision configured to allow said user to find a role model to benefits from experience of said role model;
   a Goal Meter provision configured to enable said user to stay organized to accomplish said at least one goal;
   a Manage My Task provision configured to enable said user to write, assign and mutually share said at least one action item with at least one other Linkagoal registered user;
   an alert mechanism configured to enable said user to automatically send at least one alert of current status of said at least one goal to said user;
   a My Linkagoal Messages provision configured to enable said user to send or receive messages from other participants;
   a Chat' Aura Integrated configured to enable said user to establish a chat session with said other participants;
   a Chat' Aura Station configured to enable said user to be activate by default upon establishing a Linkagoal group by said user; and
   a Chat' Aura mobile configured to enable said user to be connected to said Chat' Aura station on said Linkagoal Group to communicate with said other participants.

19. The system of claim 18, wherein said user is Linkagoal registered Internet user.

20. The system of claim 18, wherein identifying said at least one sub-goal within said main goal enables said user to be substantially specific as to what is to be required to accomplish said main goal.

21. The system of claim 18, wherein said other participants include said user, said at least one other Linkagoal registered user, and at least one non-registered user, and wherein said My Linkagoal Messages include text, picture, and video messages, and wherein said My Linkagoal Messages are tag-able to including said at least one goal, and to said at least one action item.

22. The system of claim 18, wherein said Chat' Aura station is configured to record and display knocks.

\* \* \* \* \*